(12) United States Patent
Mohebbi

(10) Patent No.: US 6,859,486 B1
(45) Date of Patent: Feb. 22, 2005

(54) METHOD FOR PREDICTING INTERFERENCE IN A FREQUENCY HOPPING CELLULAR COMMUNICATIONS SYSTEM

(75) Inventor: Behzad Mohebbi, San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/581,895

(22) PCT Filed: Dec. 7, 1998

(86) PCT No.: PCT/EP98/08120

§ 371 (c)(1),
(2), (4) Date: Oct. 10, 2000

(87) PCT Pub. No.: WO99/31914

PCT Pub. Date: Jun. 24, 1999

(30) Foreign Application Priority Data

Dec. 17, 1997 (GB) ............................................. 9726644

(51) Int. Cl.⁷ ................................................. H04B 1/69
(52) U.S. Cl. ...................................... 375/132; 370/347
(58) Field of Search ................................. 375/132, 133, 375/137; 370/319, 317, 347

(56) References Cited

U.S. PATENT DOCUMENTS

| | | | | |
|---|---|---|---|---|
| 5,425,049 A | * | 6/1995 | Dent | 375/132 |
| 6,091,955 A | * | 7/2000 | Aalto et al. | 455/447 |
| 6,175,734 B1 | * | 1/2001 | Desgagne et al. | 455/437 |
| 6,490,262 B1 | * | 12/2002 | Hogger | 370/337 |
| 6,493,331 B1 | * | 12/2002 | Walton et al. | 370/341 |

* cited by examiner

Primary Examiner—Young T. Tse

(57) ABSTRACT

A method for predicting interference experienced by a first cell (102) from a second cell (104), where both cells (102, 104) have at least one frequency hopping parameter, comprises the steps of determining (step 402) an estimated interference level corresponding to interference experienced by the first cell (102) due to the second cell (104); calculating the probability of the first cell hopping to substantially the same frequency as the second cell; weighting (step 406) the estimated interference level with the calculated probability, and modifying (step 314) the at least one frequency hopping parameter in order modify the weighted estimated interference level.

10 Claims, 4 Drawing Sheets

METHOD FOR PREDICTING INTERFERENCE IN A FREQUENCY HOPPING CELLULAR COMMUNICATIONS SYSTEM

FIELD OF THE INVENTION

The present invention relates to a method for predicting interference in a communications network, for example, a cellular telecommunications network, such as a Global System for Mobile Communications (GSM) network.

BACKGROUND OF THE INVENTION

When a cellular telephone network is planned, it is known in the art to employ a three cell reuse pattern. Such a pattern comprises a plurality of sites, each of the plurality of sites being divided into three cells and allocated a predetermined number of frequencies for the purpose of frequency hopping. A first cell is allocated a first set of frequencies, a second cell is allocated a second set of frequencies and a third cell is allocated a third set of frequencies. The frequencies and the allocation thereof is identical for each site.

However, such a plan does not account for sources of interference, for example, geographic obstacles and topography of the terrain covered by the network. This often leads to some cells having lower capacity than the majority of cells. The lower capacity cells set a limit on the network capacity as a whole.

It is therefore an object of the present invention to obviate or mitigate the problems associates with frequency planning in a cellular network.

SUMMARY OF THE INVENTION

According to a first aspect of the present invention, there is provided, a method for predicting interference experienced by a first cell from a second cell, both cells having at least one frequency hopping parameter, the method comprising the steps of: determining an estimated interference level corresponding to interference experienced by the first cell due to the second cell; calculating the probability of the first cell hopping to substantially the same frequency as the second cell; weighting the estimated interference level with the calculated probability, and modifying the at least one frequency hopping parameter in order to modify the weighted estimated interference level.

According to a second aspect of the present invention, there is provided a method of optimizing calculations corresponding to a first cell in a frequency hopping network, comprising the steps of: fitting a probability model to the probability of cells in the network hopping to substantially the same frequency; determining the cells in the network which have a probability above to a predetermined threshold of hopping to substantially the said frequency, and executing the calculations for the first cell based upon the sources of interference to the first cell which are in the determined cells.

Other, preferred, features and advantages will become apparent from the accompanying dependent claims and the following description.

It is thus possible to provide a method and apparatus for optimizing a communications network which has the maximum capacity achievable by controlling the level and probability of interference associated with frequency hopping.

BRIEF DESCRIPTION OF THE DRAWINGS

At least one embodiment of the invention will now be described, by way of example, with reference to the accompanying drawings, in which.

DESCRIPTION OF A PREFERRED EMBODIMENT

Figure 1:
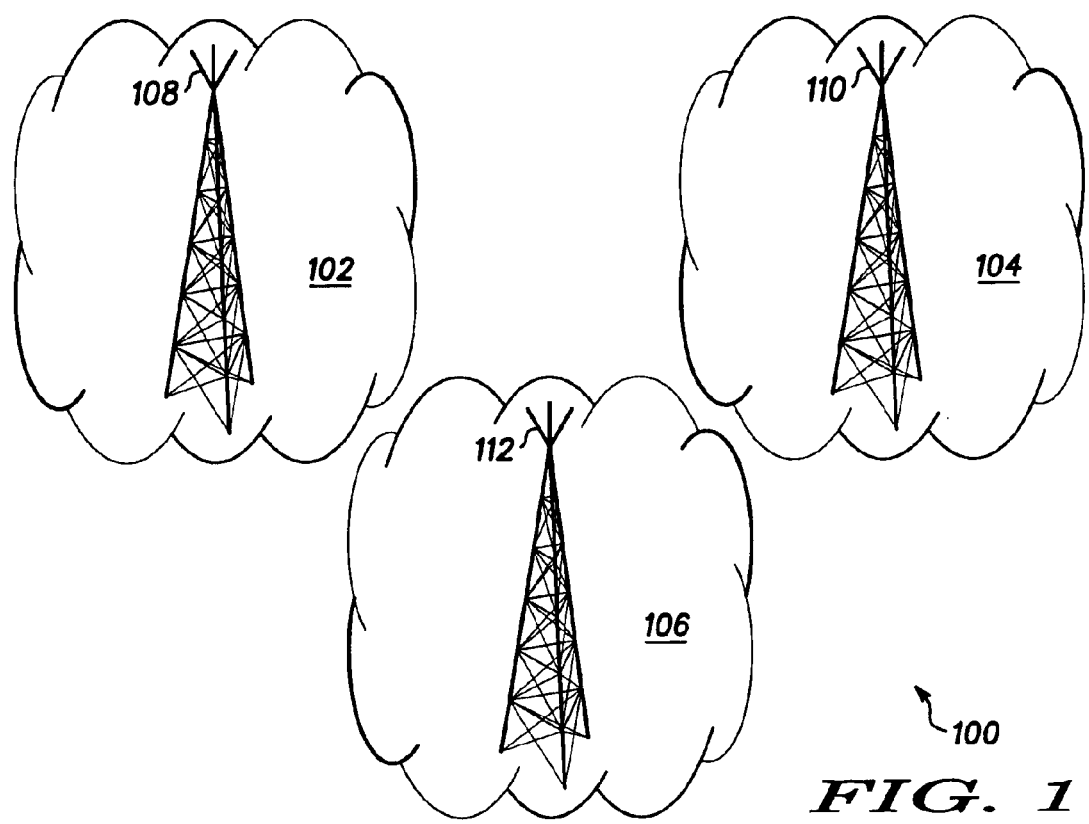
FIG. 1 is a schematic diagram of three cells in a cellular network for use with the present invention.

A cellular telecommunication network 100 (FIG. 1), for example, a GSM network, comprises a first cell 102, a second cell 104 and a third cell 106 having a respective first base station 108, second base station 110 and third base station 112 located therein. The first, second and third cells 102, 104, 106 are, for simplicity of description, omicells, but other cell configurations known in the art can be used. The first, second and third base stations 108, 110, 112 can be M-CELL base stations manufactured by Motorola Limited.

Figure 2:
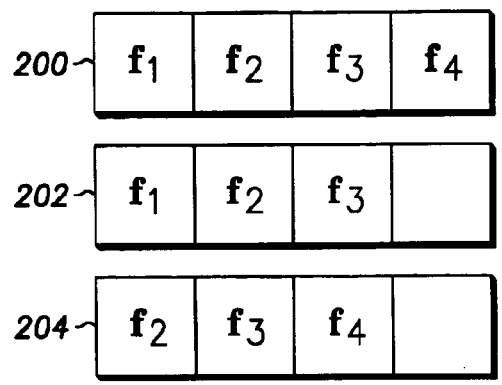
FIG. 2 is a block diagram of frequencies assigned to the three cells of FIG. 1.

Referring to FIG. 2, a first set of frequencies 200 is allocated to the first cell 102. The first base station 108 operates in a frequency hoping mode and can select any frequency from the first set of frequencies 200 for transmission of a time slot.

A second set of frequencies 202 is allocated to the second cell 104. The second base station 110 operates in a frequency hoping mode and can select any frequency from the second set of frequencies 202 for transmission of a time slot.

Similarly, a third set of frequencies 204 is allocated to the third cell 106. The third base station 112 operates in a frequency hopping mode and can select any frequency from the third set of frequencies 204 for transmission of a time slot.

Figure 3:
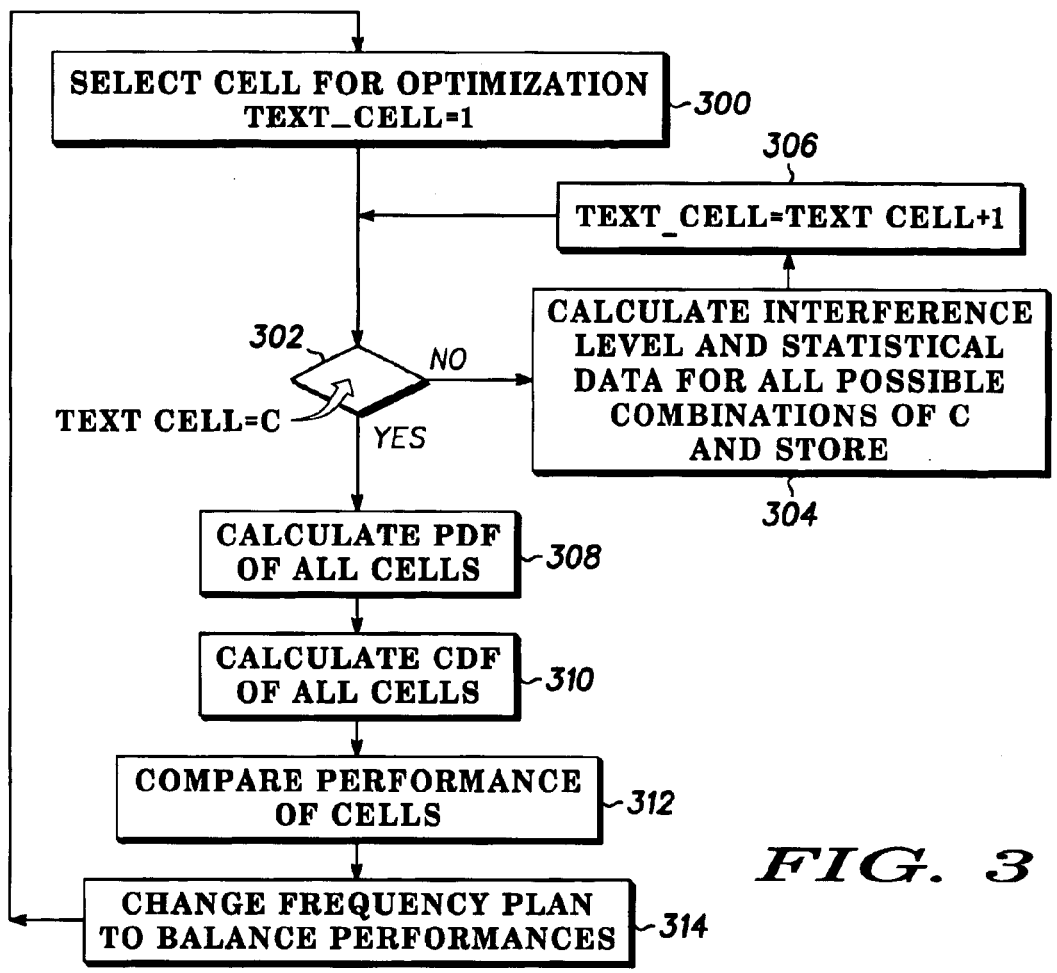
FIG. 3 is a flow diagram constituting an embodiment of the present invention.

Operation of the invention will now be described with reference to FIG. 3.

A cell is selected for optimization (step 300), for example, the first cell 102, by setting a variable, test_cell, equal to 1. The system determines (step 302) whether a total number of the cells for optimization, c, have had their corresponding interference level calculated. In the above simplified example, c is equal to 3.

When, at step 302, 'c' cells have been optimized, the system calculates an interference level and associated statistical data for the first cell, $I_{cell}$ (step 304) as follows.

Figure 4:
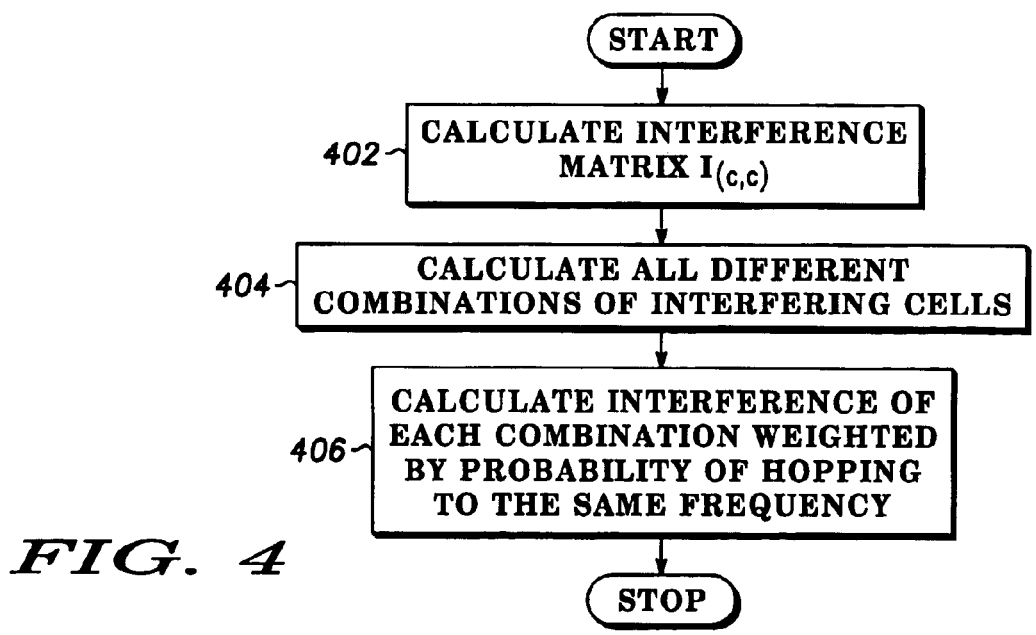
FIG. 4 is a flow diagram of a step shown in FIG. 3.

Referring to FIG. 4, an interference matrix $I_{(c,c)}$ is generated (step 402) containing interference levels corresponding to the predicted interference experienced by each cell in the network as a result of other cells in the network. The interference levels can be measured, or estimated using the Netplan software package supplied by Motorola, Inc. The interference matrix $I_{(c,c)}$ has a structure as shown in Table 1 below.

TABLE 1

|  | Cell 1 | Cell 2 | ... | ... | ... | Cell c |
|---|---|---|---|---|---|---|
| Cell 1 | $I_{(1,1)}$ | $I_{1,2)}$ | ... | ... | ... | $I_{(1,c)}$ |
| Cell 2 | $I_{(2,1)}$ | $I_{(2,2)}$ | ... | ... | ... | $I_{(2,c)}$ |
| ... | ... | ... | ... | ... | ... | ... |
| ... | ... | ... | ... | ... | ... | ... |
| Cell c | $I_{(c,1)}$ | $I_{(c,2)}$ | ... | ... | ... | $I_{(c,c)}$ |

When the Netplan software is used, a range of interference levels are generated corresponding to the interference levels at different locations in, for example, the first cell 102. In order to calculate a corresponding single value for each element of the interference matrix $I_{(c,c)}$, it is necessary to process the range of interference levels generated relating to, for example, the first cell 102 in order to obtain the single value corresponding to a nominal interference level. Such processing techniques can include the statistical mode, medium or mean, or the maximum or minimum interference level in, for example, the first cell 102. This processing technique is repeated with appropriate changes so as to calculate each entry in the interference matrix $I_{(c,c)}$. It should be appreciated that other processing techniques known in the art can be used to obtain each single value.

Once the element of the interference matrix $I_{(c,c)}$ has been calculated (step 402), a combination table containing data relating to the possible different combinations of cells interfering with the first cell 102 is generated (step 404) as shown in Table 2 below.

TABLE 2

| Cell 2 | Cell 3 |
|---|---|
| 0 | 0 |
| 0 | 1 |
| 1 | 0 |
| 1 | 1 |

The above table conforms to an incremental binary sequence. Table 2 forms part of a larger table (Table 3) shown below (the last four rows of the columns relating to Cell 2 and Cell 3). However, when optimizing the first cell 102, those cells which can interfere with the first cell 102 are only of interest and so the first four rows of the table are ignored.

TABLE 3

| Cell 1 | Cell 2 | Cell 3 |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

The 1's in the combination table (Table 2) represent the possibility of a cell interfering with the first cell 102. The 0's in the matrix represent the possibility of a cell not interfering with the first cell 102.

Given the frequency allocation of FIG. 2, it is possible to calculate a first probability of the first cell 102 hopping to a substantially identical frequency as the second cell 104.

The first probability can be expressed as:

P{h$_2$}=P{Both cell 1 and cell 2 hop to the same frequency}=
P{cells 1 and 2 hop to f$_1$} OR P{cells 1 and 2 hop to f$_2$} OR
P{cells 1 and 2 hop to f$_3$}

=¼·⅓+¼·⅓+¼·⅓=¼

Similarly, it is also possible to calculate a second probability of the first cell 102 hopping to a substantially identical frequency as the third cell 106.

The second probability can be expressed as;

P{h$_3$}=P{Both cell 1 and cell 3 hop to the same frequency}=
P{cells 1 and 3 hop to f$_2$} OR P{cells 1 and 3 hop to f$_3$} OR
P{cells 1 and 3 hop to f$_4$}

=¼·⅓+¼·⅓+¼·⅓=¼

It should be appreciated that the values of the first and second probabilities will depend upon the number of frequencies in common between the first, second and third sets 200, 202, 204 of frequencies and the number of frequencies used for hopping. The first and second probabilities can be calculated according to any method known in the art.

Each row of the combination table (Table 2) is then analysed to identify cells which could possibly interfere with the first cell 102 and an expected interference value is calculated (step 406) for each row as follows.

An entry in the combination table (Table 2) indicating a possible interference with the first cell 102, i.e. having a '1' in the appropriate location, is identified.

Thus, no 1's are present in the first row and so this row contemplates the situation where neither cell 2 nor cell 3 interfere with cell 1. Consequently, an expected interference level of 0 is recorded.

The second row signifies the possible interference between the first cell 102 and the third cell 106 only. The interference level $I_{(1,3)}$ in the interference matrix $I_{(c,c)}$ corresponding to the interference experienced by the first cell 102 due to the third cell 106 is extracted from the interference matrix $I_{c,c}$. If another entry were to exist in the second row of the combination table (Table 2), an additional entry in the interference matrix $I_{(c,c)}$ is identified and extracted.

Once all of the possible interfering cells have been identified for the second row in the combination table (Table 2), the interference levels extracted are multiplied, or weighted, by corresponding probabilities calculated above relating to the probability of two cells hopping to a substantially identical frequency. For example, for the second row of the combination table (Table 2), the calculation will be as follows:

$$p(h_3) \times I_{(1,3)}$$

The same procedure is applied to the third and fourth rows of the combination table (Table 2). Thus, for the third row, the weighted interference level is calculated as follows:

$$p(h_2) \times I_{(1,2)}, \text{ and}$$

for the fourth row, the weighted interface level is calculated as follows:

$$p(h_2) \times I_{(1,2)} + p(h_3) \times I_{(1,3)}$$

The weighted interference levels corresponding to each row of the combination table (Table 2) are then summed in order to generate an interference level corresponding to the possible combination of cells which can interfere with Cell 1.

The next cell to be optimized is then selected by incrementing (step 306) the variable, test_cell. It is then determined whether all the cells have been analysed (step 302), i.e. whether c has been reached.

The above process is then repeated for each cell to be optimized until weighted interference levels have been generated for each of the cells to be optimized.

When, at step 302, less than 'c' cells have been optimized, the system proceeds to step 308 and a probability density function (PDF) corresponding to the weighted interference levels of the cells to be optimised is generated (step 308), for example, using a "bin count" method known in the field of statistics, and a cumulative density function (CDF) is then generated (step 310) using the PDF. Step 310 is followed by step 312 wherein the performance of the cells is compared. Step 312 is followed by step 314 wherein the frequency plan is changed to balance the performances. The method then returns to step 300.

An analytical or visual means for representing the weighted interference levels of the cells is thereby provided.

The poorest performing cells are then identified using either the weighted interference levels or the CDF, and can be optimized by modifying the number and distribution of frequencies (step 314) in order to modify the weighted interference levels so as to obtain an optimum interference level throughout the network.

It should be appreciated that the interference levels are not the only criteria which can be used to optimize the network and other criteria, for example, probability levels can be used.

The above example has been described with reference to three cells for simplicity and clarity. However, it should be appreciated that a greater number of cells can be employed in the network 100.

As a further enhancement (FIG. 5) to the above technique, the interference characteristics of the network 100 can be modelled using a probability distribution, for example, a binomial distribution (step 600).

The binomial distribution can then be used to reduce the number of computations required by determining the number of cells which are likely to contribute significantly to interference experienced by a given cell.

Figure 6:
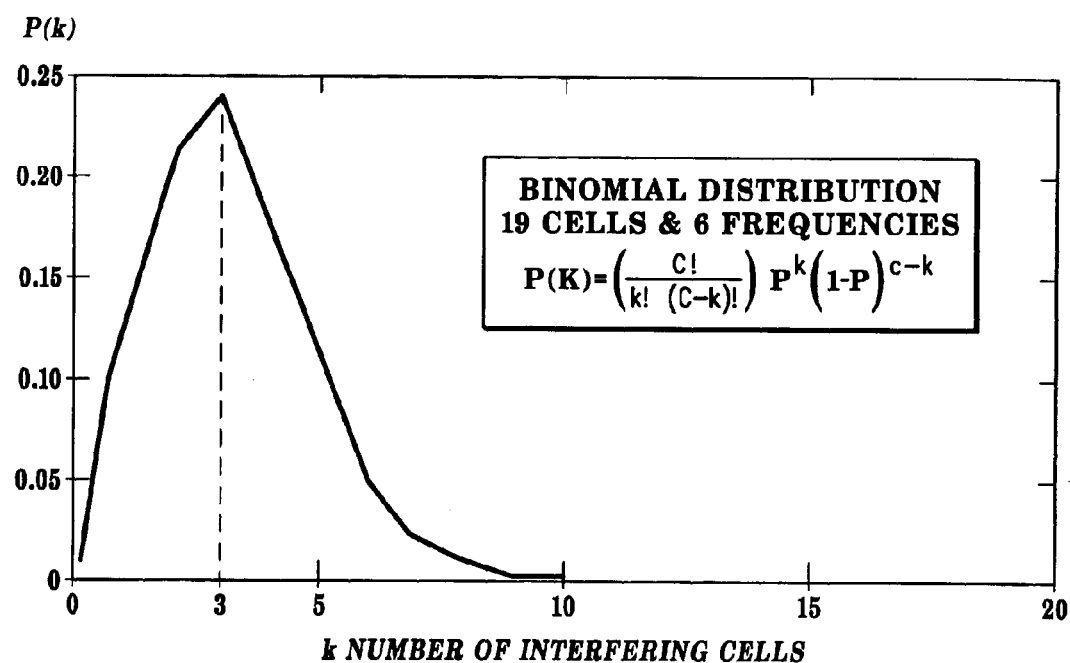
FIG. 6 is a probability distribution for use with the enhancement of FIG. 5.

For example, as shown in FIG. 6, the network 100 may comprise 19 cells using 6 identical frequencies for frequency hopping. The binomial distribution for such an arrangement shows that the probability of 10 cells or more using the same frequency at the same time is very low. Therefore, in order to reduce the computational burden, the first 10 strongest interfering cells (which can be determined from the interference matrix $I_{(c,c)}$) can be used (step 602) for network optimization in accordance with the method described above, instead of using all the cells in the network. An additional modification to the method being that the interference matrix is generated (step 604 and step 606) based upon the selected number of interfering cells.

Since a subset of all possible permutations of cells is only considered, a correction factor can be applied, for example, a simple ratio between the number of permutations ignored and the number of total possible permutations. However, if the contribution to the interference level from the ignored cells is minimal, the correction factor may not be required.

Specifically, the method of FIG. 6 starts in step 600 wherein the binomial distribution $$P(k) = \binom{c}{k} \cdot p^k \cdot (1-p)^{c-k}$$

where c is the total number of cells, k is the number of cells at any given frequency and p is the probability of transmission on a given frequency.

Figure 5:
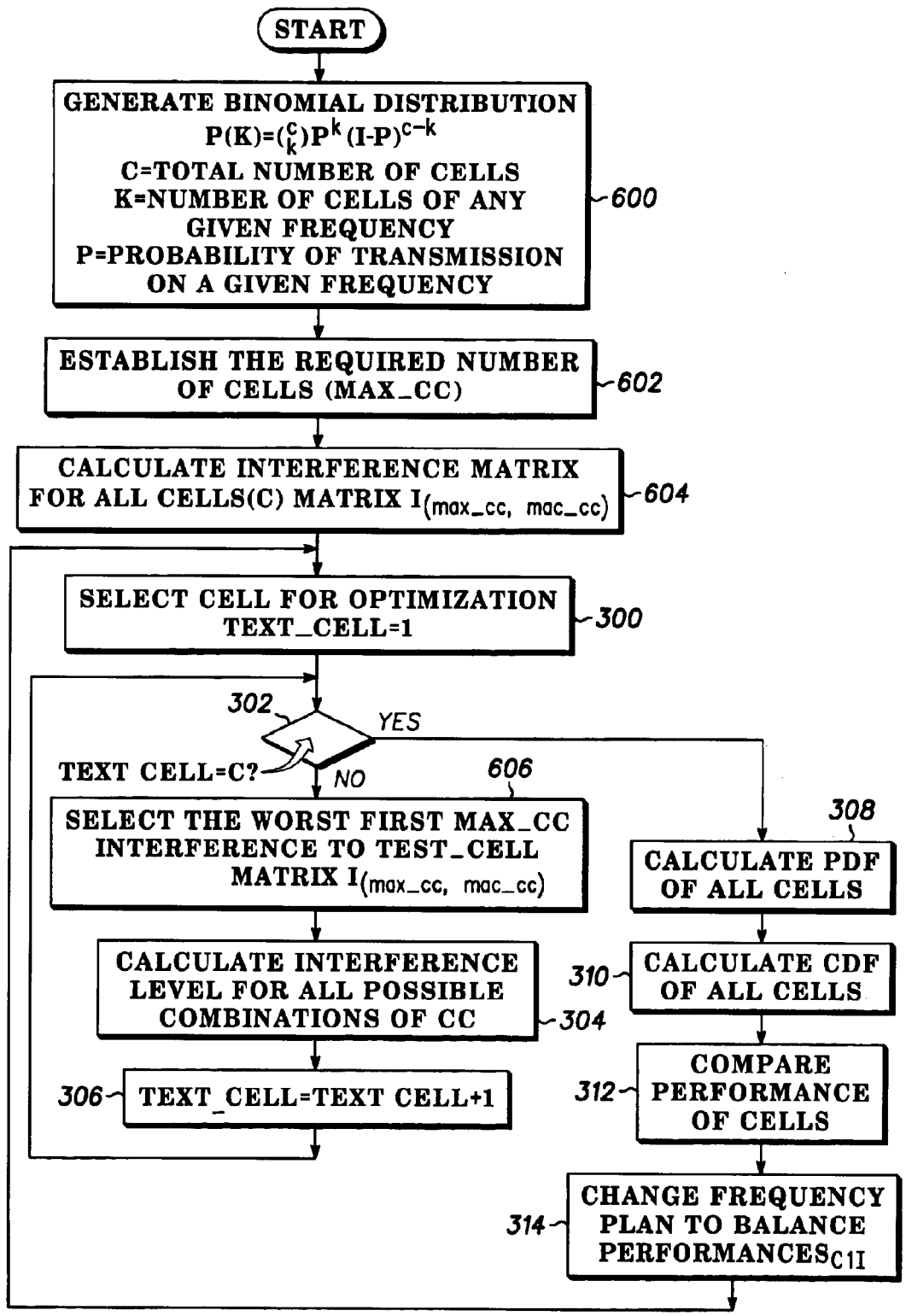
FIG. 5 is a flow diagram of an enhancement of FIG. 3.

FIG. 5 illustrates an example of a binomial distribution in accordance with the above equation for 19 cells and 6 frequencies.

Step 600 is followed by step 602 wherein the required number of cells is established.

Step 602 is followed by step 604 wherein an interference matrix is calculated for all cells. The method than proceeds in step 300 wherein a cell is selected for optimisation.

Step 300 is followed by step 302 wherein it is determined if the last cell for optimisation has been optimised. If not, step 302 is followed by step 606. Otherwise, it is followed by step 308.

In step 606 wherein the required number of cells as determined in step 604 are selected by selecting the compounding number of cells having the worst interference levels.

Step 606 is followed by step 304 wherein the interference level for all possible cell combinations is calculated. Step 304 is followed by step 306 wherein the next cell for optimisation is selected. The method then returns to step 302.

In step 308 a probability density function is calculated for all cells.

Step 308 is followed by step 310 wherein a communications function is calculated for all cells.

Step 310 is followed by step 312 wherein the performance of the cells is compared.

Step 312 is followed by step 314 wherein the frequency plan is changed to balance the performances. The method then returns to step 300.

What is claimed:

1. A method for predicting interference experienced by a first cell from a second cell, both cells having at least one hopping parameter, the method comprising the steps of:
   determining an estimated interference level corresponding to interference experienced by the first cell due to the second cell;
   calculating the probability of the fist cell hopping to substantially the frequency as the second cell;
   weighting the estimated reference level with the calculated probability; and
   modifying the least one frequency hopping parameter of at least the one of the first and second cell in order to modify the weighted estimated interference level.

2. The method as claimed in claim 1, wherein the at least one frequency hopping parameter is the number of frequencies used by the first cell.

3. The method as claimed in claim 1, wherein the at least one frequency hopping parameter is the choice of frequencies used for frequency hopping by the first cell.

4. The method as claimed in claim 1, further comprising providing further cells having corresponding frequency hopping parameters, and
   determining further estimated interference levels corresponding to interference experienced by the first cell due to further cells;
   calculating the further probabilities of the first cell hopping to substantially the same frequency as each of the further cells;
   weighing the further estimated interference levels with the corresponding calculated further probabilities; and
   modifying the at least one frequency hopping parameter in order to optimise the weighted estimated interference level ad the further weighted estimated interference levels.

5. The method as claimed in claim 4, further comprising forming a matrix including the estimated interference level and the further weighted estimated interference levels.

6. The method as claimed in claim 5, further comprising forming a probability density function based on the weighted estimated interference level and the weighted estimated interference levels.

7. The method as claimed in claim 6, further comprising forming a cumulative density function based on the probability density function.

8. The method as claimed in claim 1, wherein calculating comprises:
   fitting a probability model to the probability of cells in a network hopping to substantially the same frequency;
   determining the cells in the network which have a probability above a predetermined threshold of hopping to substantially the same frequency, and
   executing calculations for the first cell based upon the sources of interference to the first call which are in the determined cells.

9. A method as claimed in claim 8, wherein the determined cells comprise the strongest sources of interference in the network.

10. A method as claimed in claim 8, wherein the probability model is a binomial probability model.

* * * * *